United States Patent [19]

Ruckstuhl

[11] Patent Number: 4,907,909
[45] Date of Patent: Mar. 13, 1990

[54] PAVING STONE SET

[76] Inventor: Willi Ruckstuhl, Augwilerstrasse 48, CH-8302 Kloten, Switzerland

[21] Appl. No.: 175,526

[22] Filed: Mar. 31, 1988

[30] Foreign Application Priority Data

Apr. 2, 1987 [CH] Switzerland ............ 1270/87

[51] Int. Cl.$^4$ ............................................. E01C 5/06
[52] U.S. Cl. ........................................ 404/37; 404/38; 404/42
[58] Field of Search ............ 404/34, 37, 38, 39, 404/41, 42; 52/604, 608; D25/113, 115, 144, 157

[56] References Cited

U.S. PATENT DOCUMENTS

| 101,691 | 4/1870 | Williams | 404/41 |
| 114,895 | 5/1871 | Willet | 404/39 |
| 933,521 | 9/1909 | Atherton | 404/38 |
| 2,060,746 | 11/1936 | Porter | 404/38 |
| 3,828,509 | 8/1974 | Ottmar et al. | 52/608 X |
| 4,411,119 | 10/1983 | Miller | 404/34 X |
| 4,496,266 | 1/1985 | Ruckstuhl | 404/41 |
| 4,627,764 | 12/1986 | Scheiwiller | 404/41 |
| 4,761,095 | 8/1988 | Bartlechner | 404/41 |
| 4,821,479 | 4/1989 | Lucak | 52/608 X |

FOREIGN PATENT DOCUMENTS

3507226 9/1986 Fed. Rep. of Germany .
2127872 4/1984 United Kingdom ............. 404/41

Primary Examiner—Jerome W. Massie
Assistant Examiner—Matthew Smith
Attorney, Agent, or Firm—Willian Brinks Olds Hofer Gilson & Lione

[57] ABSTRACT

The paving stone set consists of stones 11–16 each with six lateral boundary surfaces 1–6, 17–22. Four of these boundary surfaces 1 and 4; 3 and 5; 18 and 21; 19 and 22 are parallel to one of the other of the four surfaces, while the remaining two surfaces 2 and 6; 17 and 20 define planes which intersect at an acute angle. On the straight edges, the stones 11–13 are laid alternatingly. A joint pattern is created with expansion joints, which do not stand vertically to the support joints. The expansion joints are formed from two wedges directed opposite to one another, and therefore have an effect which is irregular in comparison with the support joints. The slotted boundary surfaces 2, 6 make it possible to lay the stones 11–13 according to the sloping angles selected in curves with small radii chosen as desired, whereby the wedge-shaped joints close gradually. The stones 14–16 serve as a supplementary curve set, and make possible the laying of Roman arrow patterns, as well as an Archimedean spiral. The paving stone set can be quickly and simply laid down without trimming the stones.

7 Claims, 7 Drawing Sheets

FIG_4

FIG_5c_

FIG_5d_

PAVING STONE SET

BACKGROUND OF THE INVENTION

The present invention relates to a set of paving stones prefabricated at the factory, and particularly to such stones cast from concrete.

Natural stone pavements require a high degree of manual skill and are particularly attractive aesthetically, due to their irregular shapes. The laying of natural stones is, however, particularly expensive, since every stone must be individually selected from a supply of roughly-hewn stones, and trimmed at the laying site to accommodate curves or boundary joints. This requires a considerable investment of time in manual labor, and contributes significantly to the high costs. Quarrying natural stones ready for laying also involves considerable expense. Paving stones are obtained in special stone quarries, depending on the type of stone desired, where they are first roughly reduced and trimmed into a paving stone format. Transportation costs from the quarry are also considerable, since the stone quarries which yield the most particularly suited types of stones are frequently located great distances from the laying site.

In order to lower the costs, paving stones are presently fabricated into so-called "composite stones." These are cast from concrete into different, but uniform, shapes. A pavement can then be composed from a single stone shape, with identical stones lined up against one another. The joints between the stones are all closed, so that the stones fit snugly together. Although the laying of such pavements proceeds relatively quickly, one disadvantage of such composite pavements is that their highly regular appearance does not appeal to many individuals.

The appearance of natural stone pavements, on the other hand, is in demand particularly for use in homes having a rustic construction style, in guest homes of private villas, and in older urban areas for new pavements. Increasingly, asphalt pavements are being torn up in older traditional areas of various cities, and replaced with paving stones, mainly in order to create pedestrian lanes. The costs of such urban construction measures are, however, considerable, if natural stones are used for this purpose.

From OS-DE 35 07 226 A1, a paving stone set is disclosed, which consists of several square and rectangular stones, manufactured by casting concrete. The stones preferably have the same width and five different lengths. By placing two stones next to one another, a specific length can be achieved.

The stones have a base socket nearly all the way around as a distancing element, which serves to create regular joint widths. Furthermore, these base sockets permit the individual stones to be placed in rows next to one another in a pressure force-locking manner. The plaster stones in accordance with this disclosure have the disadvantage, however, that curves and edge seals are difficult to attain. As a result, the stones must be partially trimmed or else they cannot be placed in snugly fitting rows. This leads to excessive joint thicknesses, and disturbs the overall pattern of the pavement.

SUMMARY OF THE INVENTION

The present invention is a set of prefabricated paving stones, which is characterized in that the paving stones have six even lateral boundary surfaces, four of which are each parallel to one of the other of the four lateral boundary surfaces. The remaining two lateral boundary surfaces are oriented opposite one another at an acute angle.

The principal advantages of this invention are that it is cost-effective with respect to manufacturing and laying of the pavement stones, and the stones have an irregular joint pattern similar to natural paving stones, yet can be fitted around curves and edges without trimming the stones.

The foregoing features and advantages of this invention will become readily apparent to those skilled in the art upon consideration of the following description of the preferred embodiments, taken in conjunction with the accompanying drawings.

BRIEF DESCRIPTION OF THE DRAWINGS

In the diagrams, there are depicted by way of example one presently preferred embodiment of the paving stone set in accordance with the invention, as well as a number of laying patterns. These show the following.

DESCRIPTION OF THE PREFERRED EMBODIMENTS

Figure 1:
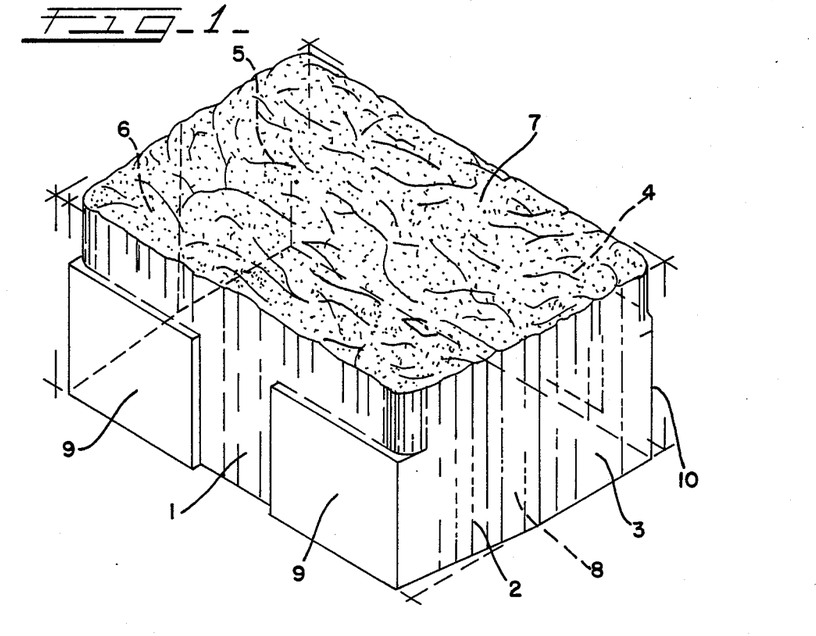
FIG. 1: A paving stone from the paving stone set in a perspective view.

The paving stone shown in FIG. 1 shows the essential construction of a stone in the paving stone set in accordance with the invention, with six even, lateral boundary surfaces 1, 2, 3, 4, 5 and 6. The upper boundary surface 7 and lower boundary surface 8 are parallel to one another, and perpendicular to the lateral boundary surfaces 1–6. The lower surface 8 is even, while the upper boundary surface 7, which is still visible after laying, has an irregular appearance. Such a surface advantageously has the appearance of the surface of natural stone. Protrusions 9 and 10 are located on the lateral boundary surfaces 1 and 4. When the stones are placed in rows next to one another, these protrusions serve as stopping or distancing elements. Since they do not reach to the upper boundary surface, they remain invisible when the stones are laid down. In the stone depicted here, the lateral surfaces 1 and 4, as well as 3 and 5, are parallel to one another. These surfaces are positioned on opposite sides of the stone. The boundary surfaces 2 and 6, on the other hand, define planes which intersect each other at an acute angle. The paving stone shown here can be divided into two halves. The first half includes those surfaces 6, 1 and 2 which define a trapezoidal portion (with surface 1 forming the shorter base), while the second half includes the remaining lateral boundary surfaces 3, 4 and 5 which define a rectangular portion.

Figure 2:
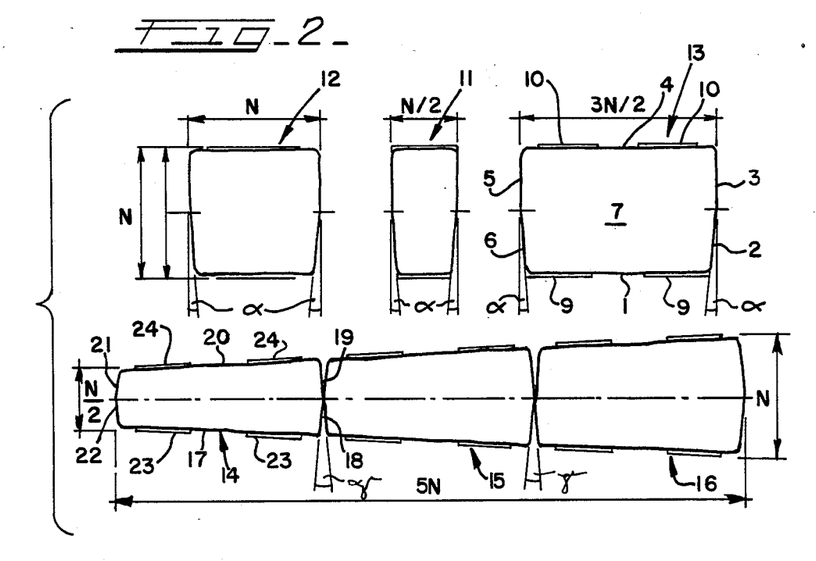
FIG. 2: A paving stone set in accordance with the invention, viewed from above.

In FIG. 2, a complete paving stone set in accordance with the invention is depicted in a view from above. Stones 11, 12 and 13 which have an essentially rectangular form are the most commonly used base stones for a pavement. With a normal width of N, the stone set contains one paving stone 11 with length N/2, a second 12 with length N, and a third 13 with length 3N/2. This selection of different lengths makes possible a very versatile and simple laying process, so that an irregular joint pattern always arises, in which the joints are continuously staggered.

The stones are advantageously placed in rows next to one another so that adjacent stones are rotated by 180°. The joint pieces arising through the slightly sloped surfaces 2 and 6 are alternatingly laid to the right and to the left. The sloped lateral boundary surfaces 2 and 6 define planes which intersect at an acute angle. The angle, which is thus formed between the boundary surfaces 2 or 6 and the base 1 of the stated trapezoid or the boundary surface 4, is (90°—alpha), with alpha being between 3° and 8°.

Three additional stones 14, 15, and 16 are shown in FIG. 2, which all appear similar to one another. It is evident from the example of the stone 14 that six lateral boundary surfaces 17–22 are also present here. The surfaces 18 and 21, as well as the surfaces 19 and 22, are parallel to one another, while the boundary surfaces 17 and 20 together define planes that intersect each other at an acute angle. The surfaces 17 and 20 are further provided with protrusions 23 and 24, which serve as stopping and distancing elements during laying. The boundary surfaces 19 and 22 as well as 19 and 21 form the trapezoidal side. Together they define planes which intersect each other at an angle of gamma, with gamma being between 3° and 8°. In stones 14–16, the angle gamma is about 5.7°. This angular measure makes it possible to lay a set of three stones 14–16 a total of 15 times in a circular pattern, with the boundary surfaces 18 and 22 each being snugly connected with one another, thus completing a circle. This circle can then serve as the starting point for the laying of an Archimedean spiral, as will be illustrated later in FIGS. 7a–b.

Paving stones 14 and 16 of the stones set form a so-called curve set. Path curves can be constructed by means of the individual or multiple interposing of such curve set stones. When laying the curve set stones as shown in FIG. 2, the width of the wide end of the wedge formed on stone 16 (corresponding to base sides 18 and 19 of stone 14) is equal to stone width N of the stone for the linear fitting, and then tapers to a wedge tip of width N/2. The entire length over the three curve set stones amounts to 5 stone widths N, or 5N. The reason for this particular dimensioning will be made evident and is illustrated by means of the figures which are described in the following diagrams, which depict the particular laying patterns.

Figure 3:
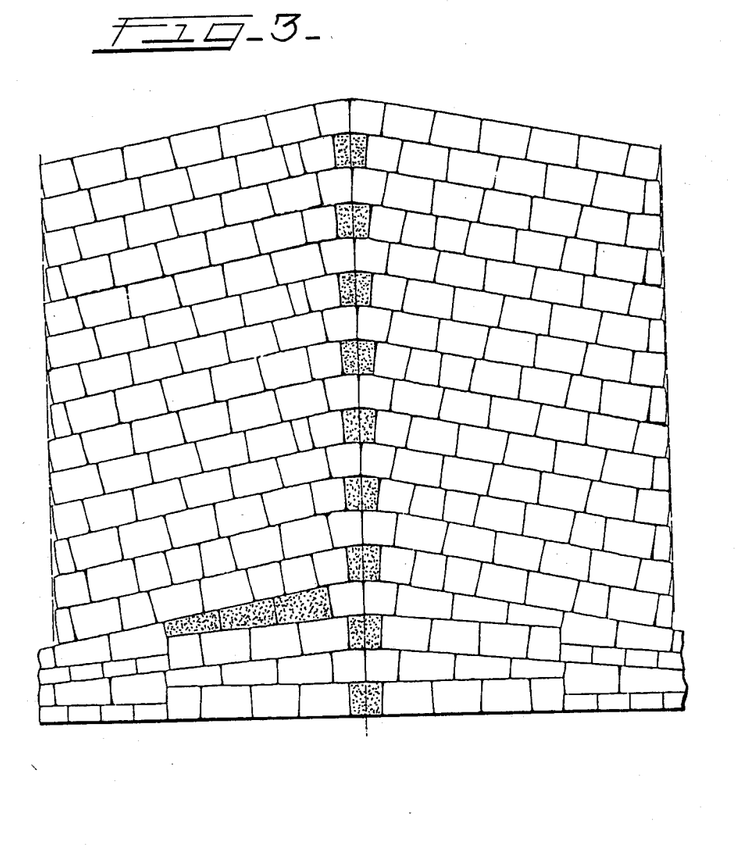
FIG. 3: The laying pattern of the paving stone set in an arrow pattern.
Figure 4:
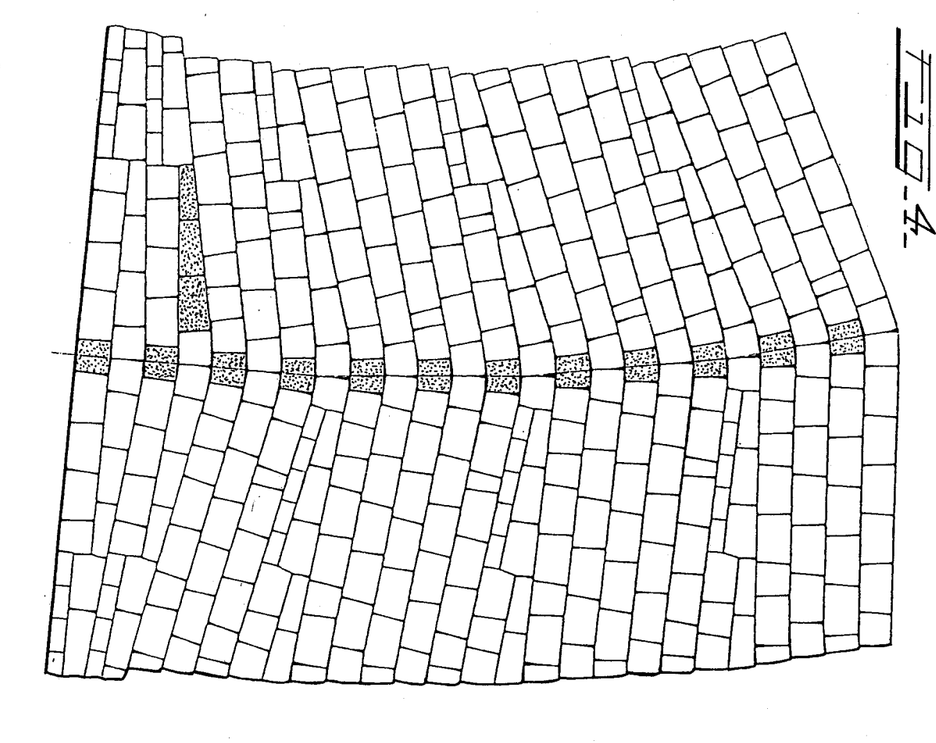
FIG. 4: One type of laying, in an arrow pattern conducted around a curve.
Figure 5A:
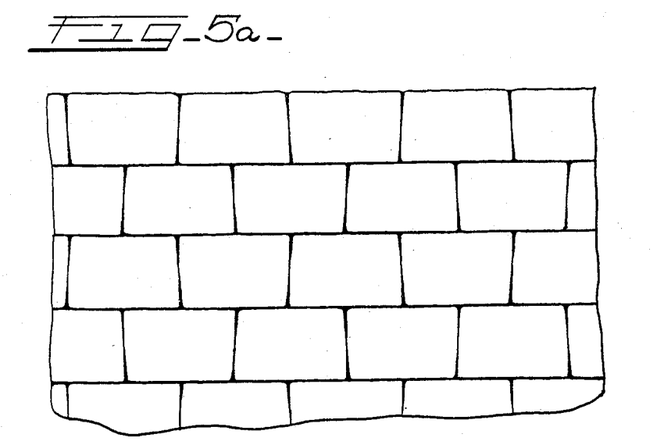
FIG. 5a–d: A number of linear laying patterns.
Figure 5B:
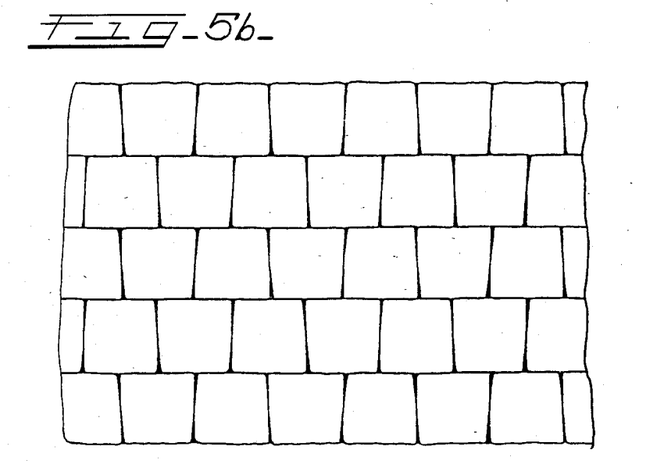
Figure 5C:
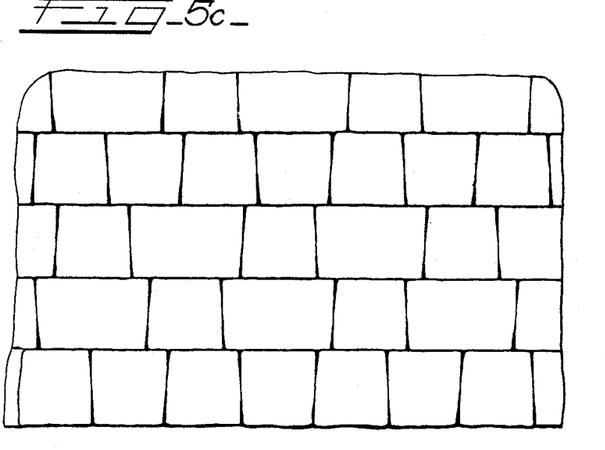
Figure 5D:
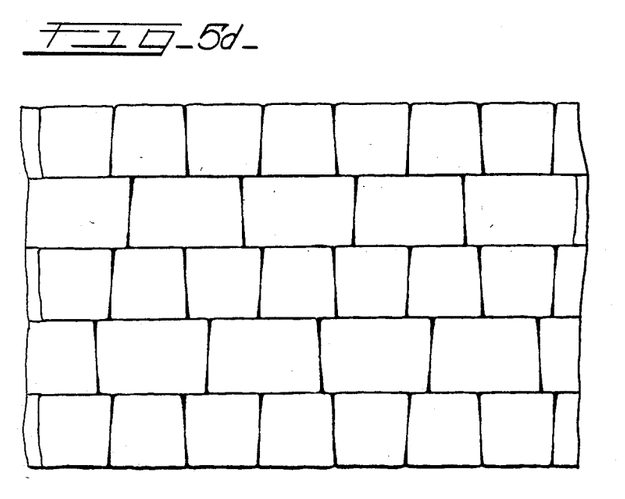
Figures 6A, 6B:
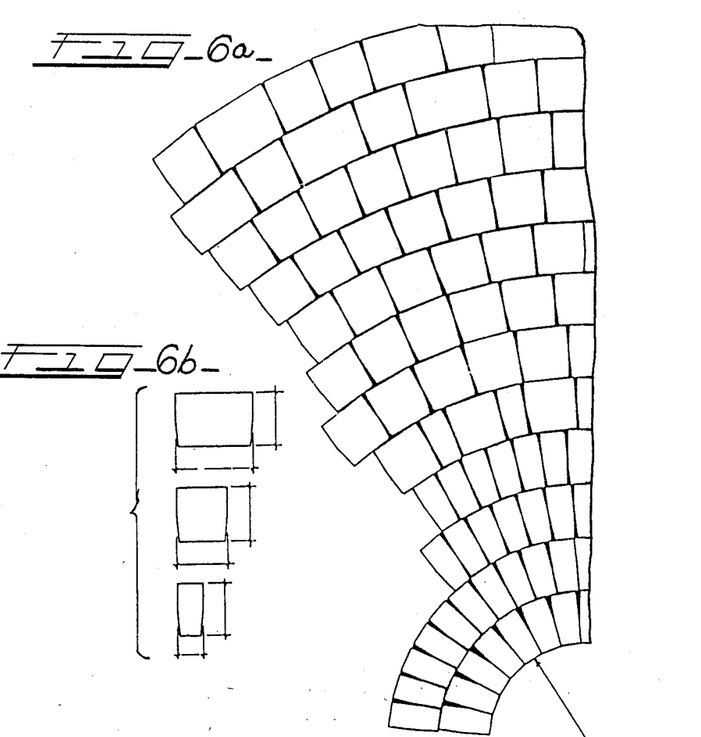
FIG. 6a–e: Laying in a circular rondel pattern.
Figure 6C:
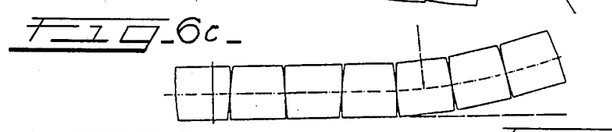
Figures 6D, 6E:
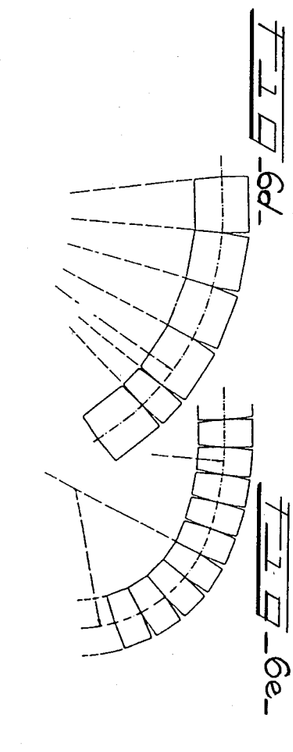

In addition to the linear type of laying already stated, FIG. 3 shows the antique, Roman arrow pattern, which is attractive for walking paths. By arranging the stones in an arrow-shape, two distinctly separable path halves are created. The center can be additionally marked by means of colored stones, thus contributing to the safety of the path by separating it into two motion directions in an optically distinct manner. As FIG. 4 shows, the Roman arrow shape can be laid in a curve by means of the paving stone set in accordance with the curve set of the invention. The laying of even this complicated shape is possible with the present paving stone set without trimming individual stones.

FIGS. 5a–d show, by means of various laying patterns, how the paving stone set is generally laid down. Basically, during linear laying, the next stone is rotated by 180° relative to the one previously laid down. While the longitudinal joints or support joints are generally of the same thickness, the lateral or expansion joints have another, but still typical, joint pattern. They are each formed from two wedge-shaped joints, which meet one another at the wedge points. By means of this type of joint, the impression of a certain natural irregularity is conveyed, without disturbing the overall joint pattern. The expansion joints do not appear to be vertically placed on the support joints. Each stone is snugly placed on each side to the one adjacent, that is, laid down in a pressure force-locking manner. This is in particular made possible through the protrusions 9, 10, 23, and 24 projecting on the boundary surfaces, whereas, on the lateral sides during alternate laying, the edges between the boundary surfaces 2 and 3, 5 and 6, 18 and 19, as well as 21 and 22, absorb the specific expansion forces. The individual stone is held immovably in the pavement by means of a force-locking connection with its adjacent stones, so that expansion and traction forces as well as torsion forces, which inevitably arise from motor vehicles, and especially trucks, for example, are absorbed. By means of the alternating use of stones of different lengths, the illusive impression of natural stone pavement is created.

As shown in FIGS. 6a–e, the paving stone set in accordance with the invention permits more than a simple linear laying pattern. If the various stones are, for example, placed in rows in sequence with the boundary surfaces which form the trapezoidal surfaces, then a circular rondel pattern can be laid down, as is shown in FIG. 6. The greater the radius of the rondel, the more frequently the individual stones need to be moved by 180°. Despite the fact that the rondel shown here is constructed from three different stones, an irregular joint pattern is achieved, which simulates a natural stone pavement.

Figure 7A:
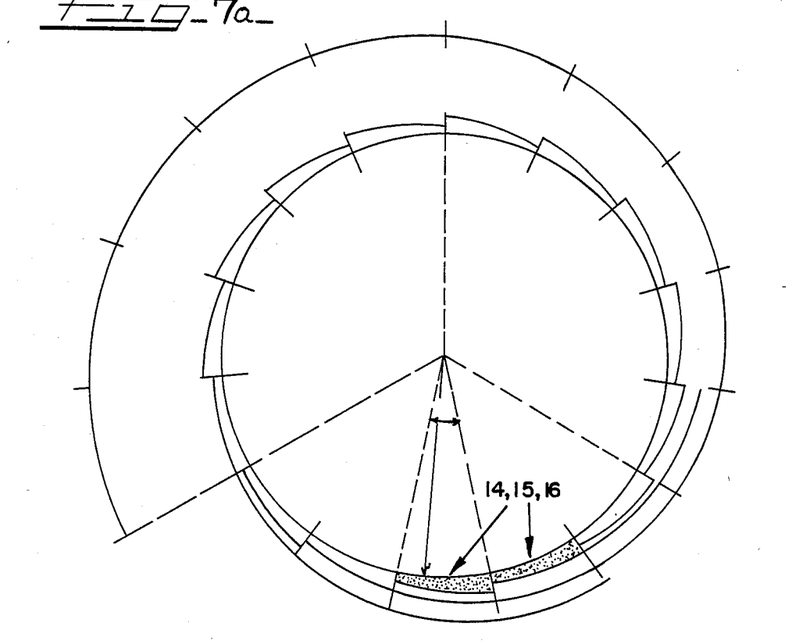
FIG. 7a–b: Laying in an Archimedean spiral.
Figure 7B:
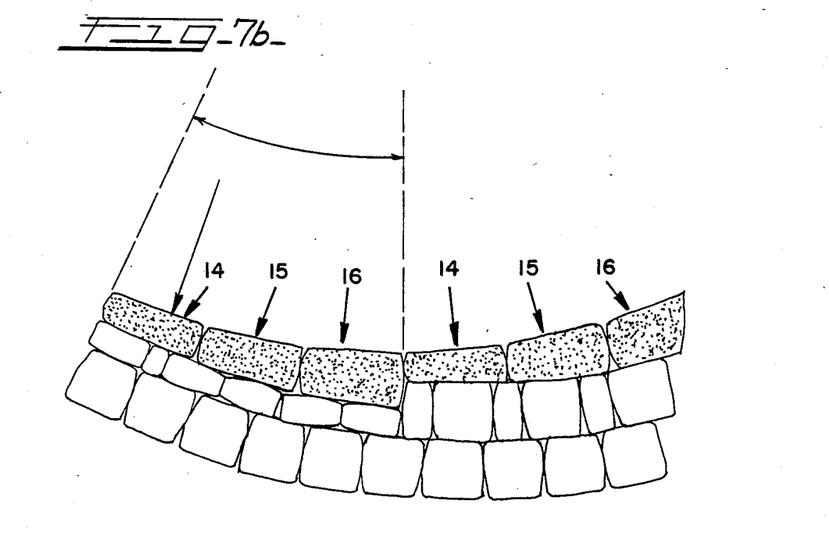

Finally, FIGS. 7a,b illustrate the laying of an Archimedean spiral using the curve set. Laying proceeds from a circular surface, which is made by arranging 15 single curve sets into a circular arrangement. Then, on a first curve set and on every other external one, a series of stones of the length N/2 is laid down. On the remaining curve sets, stones of the length N are laid down. From the first curve set on, an Archimedean spiral of the width N can be seamlessly laid down, and continue by means of corresponding stones. The radius of the spiral thus increases by seven stone rows of the width N for every 360°. In conventionally laid spirals, the increase of the radius per 360° relative to the increase of the radius amounts to only one stone band width.

The present paving stone set permits a multiplicity of formational patterns, such as have been shown and illustrated hereinabove in a number of examples. Its particular adaptability to curves is due to its special form, which allows radii to be laid to below 2.5 times the height of the stone, without special curve stones. In all type of laying, the stones are thrust deeply against one another, so that a longitudinal axial transmission of thrust is possible. In radii of 10 times the stone height, which corresponds to a practical level of 1.26 m, the joint widths internally and externally are still as large as in the straight ones. The joint pattern remains unchanged. With smaller radii, the internal expansion joint halves close gradually, until, with a radius of 2.5 times the stone height and when using half stones, they close entirely. This is the case with a radius of approximately 30 cm.

Although the present invention has been described in connection with presently preferred embodiments, those skilled in the art will recognize many modifications to arrangements, materials, and elements which can be used in the practice of the invention without departing from its scope. It is intended that such changes and modifications be covered by the following claims.

What is claimed is:

1. A paving stone set comprising at least six prefabricated pavement stones, each of said pavement stones having a flat bottom and a substantially structures top surface and, perpendicular thereto, six substantially planar, lateral boundary surfaces, four of said boundary surfaces being parallel to one of the other of said four boundary surfaces, and the remaining two boundary surfaces being opposite one another at an acute angle, at least three of said stones, when being seen in top view, each having a rectangular portion on one half and a trapezoidal portion on the other half with the lateral boundary surfaces defining two sides and a shorter base of said trapezoidal portion and, at least three further stones, when being seen in top view, each having an essentially trapezoidal portion on each half, the lateral boundary surfaces defining two sides and a shorter base of said essentially trapezoidal portions with the shorter bases being oriented opposite one another at an acute angle.

2. The paving stone set of claim 1, wherein said stones having a rectangular and trapezoidal portion have protrusions on lateral boundary surfaces thereof, that is, on the shorter trapezoidal base and on the rectangular base being opposite said shorter trapezoidal base, said protrusions functioning as distancing and stopping elements, and wherein the stones having two essentially trapezoidal portions have protrusions on the shorter base of the trapezoidal portions.

3. The paving stone set one of claim 1 or 2, wherein the three stones having a rectangular and trapezoidal portion have a common width N, and three different lengths N/2, N and 3N/2, and wherein the three stones having two essentially trapezoidal portions, when placed in a series along their symmetrical axis, form a wedge of length 5N, with a base width N and a wedge tip width N/2.

4. The paving stone set of one of claims 1 or 2 wherein each of the trapezoidal sides of said stones having a rectangular and a trapezoidal portion are oriented with respect to the trapezoidal base at an angle of 90° minus alpha, alpha being between 3° and 8°.

5. The paving stone set of claim 3, wherein each of the trapezoidal sides of said stones having a rectangular and a trapezoidal portion are oriented with respect to the trapezoidal base at an angle of 90° minus alpha, alpha being between 3° and 8°.

6. The paving stone set of one of claims 1 or 2, wherein the trapezoidal sides of said stones separated into two trapezoidal portions are oriented with respect to each other at an angle of gamma, gamma being between 3° and 8°.

7. The paving stone set of claim 3, wherein the trapezoidal sides of said stones separated into two trapezoidal portions, are oriented with respect to each other at an angle of gamma, gamma being between 3° and 8°.

* * * * *

UNITED STATES PATENT AND TRADEMARK OFFICE
CERTIFICATE OF CORRECTION

PATENT NO. : 4,907,909
DATED : March 13, 1990
INVENTOR(S) : Willi Ruckstuhl It is certified that error appears in the above-identified patent and that said Letters Patent is hereby corrected as shown below:

In column 2, line 44, please delete "appearance" and substitute therefor --structure--; and after "surface" please insert --structure--.

Column 5:
In claim 1, line 3, please delete "structures" and substitute therefor --structured--.

Column 6, claim 3, line 1, after "set" insert --of--.

Signed and Sealed this

Fifteenth Day of September, 1992

*Attest:*

DOUGLAS B. COMER

*Attesting Officer*     *Acting Commissioner of Patents and Trademarks*